(12) United States Patent
Ouderkirk

(10) Patent No.: US 10,737,450 B1
(45) Date of Patent: Aug. 11, 2020

(54) FABRICATION OF GRADED INDEX LIGHT GUIDES

(71) Applicant: Facebook Technologies, LLC, Menlo Park, CA (US)

(72) Inventor: Andrew John Ouderkirk, Kirkland, WA (US)

(73) Assignee: FACEBOOK TECHNOLOGIES, LLC, Menlo Park, CA (US)

( * ) Notice: Subject to any disclaimer, the term of this patent is extended or adjusted under 35 U.S.C. 154(b) by 101 days.

(21) Appl. No.: 15/788,756

(22) Filed: Oct. 19, 2017

(51) Int. Cl.
    *B29D 11/00* (2006.01)
    *G02B 6/02* (2006.01)
    *B29C 48/21* (2019.01)
    *B29C 48/30* (2019.01)
    *B29C 48/305* (2019.01)

(52) U.S. Cl.
    CPC ........ *B29D 11/00682* (2013.01); *B29C 48/21* (2019.02); *B29C 48/30* (2019.02); *B29C 48/307* (2019.02); *G02B 6/02038* (2013.01); *B29K 2995/0031* (2013.01)

(58) Field of Classification Search
    CPC ... B29D 11/00682; B29C 48/21; B29C 48/30; B29C 48/307; G02B 6/02038
    See application file for complete search history.

(56) References Cited

U.S. PATENT DOCUMENTS

| 5,876,902 | A | 3/1999 | Veneklasen et al. |
| 8,168,373 | B2 | 5/2012 | Shew |
| 8,975,601 | B1 | 3/2015 | Chen |
| 9,378,926 | B2 | 6/2016 | Kuo et al. |
| 9,690,208 | B2 | 6/2017 | Yu |
| 2003/0132536 | A1* | 7/2003 | Zhen .......... D01F 8/10 264/1.29 |
| 2013/0058370 | A1 | 3/2013 | Chang-Hasnain et al. |
| 2013/0183015 | A1* | 7/2013 | Mori .......... G02B 6/122 385/126 |

OTHER PUBLICATIONS

"Blazed grating", retrieved from https://en.wikipedia.org/wiki/Blazed_grating, Dec. 26, 2016 and printed on Oct. 29, 2018.
"Electron-beam lithography", retrieved from https://en.wikipedia.org/wiki/Electron-beam_lithography, Sep. 12, 2017 and printed on Feb. 10, 2017.
"Grayscale Lithography", retrieved from http://www.eng.auburn.edu/~sylee/gray.html, Sep. 30, 2017 and printed on Oct. 29, 2018.

(Continued)

*Primary Examiner* — Mathieu D Vargot
(74) *Attorney, Agent, or Firm* — Kilpatrick Townsend & Stockton LLP

(57) ABSTRACT

An optical element is produced by introducing a first liquid and a second liquid into respective inlets of a mold. The inlets are connected to a channel that extends to an outlet of the mold, the channel being tapered towards the outlet. The first and second liquids have different refractive indices and partially diffuse into each other inside the channel to form a multi-layer structure. The multi-layer structure is extruded through the outlet, onto a substrate. Curing the first and second liquids forms a solid optical element having a spatially varying refractive index profile in at least one dimension.

20 Claims, 10 Drawing Sheets

(56) References Cited

OTHER PUBLICATIONS

"Optical Components", retrieved from https://microdevices.jpl.nasa.gov/capabilities/optical-components/process-for-3-d-surface-relief-profiles.php and printed on Feb. 10, 2017.
"Stitch-free Lithography", retrieved from https://www.raith.com/technology/stitch-free-lithography.html, 2017 printed on Feb. 10, 2017.
Kirchner, et al., "ZEP520A—A resist for electron-beam grayscale lithography and thermal reflow", Microelectronic Engineering, vol. 153, Mar. 5, 2016, 3 pages.
NIST, "New Grayscale Technique Opens a Third Dimension for Nanoscale Lithography", retrieved from https://www.nist.gov/news-events/news/2013/08/new-grayscale-technique-opens-third-dimension-nanoscale-lithography, Aug. 28, 2013 and printed on Feb. 10, 2017.
Yu, et al., "The evaluation of photo/e-beam complementary grayscale lithography for high topography 3D structure", Proc. SPIE 8682, Advances in Resist Materials and Processing Technology XXX, 868212, retrieved from http://proceedings.spiedigitallibrary.org/proceeding.aspx?articleid=1674320, Mar. 29, 2013 and printed on Feb. 10, 2017.

\* cited by examiner

FABRICATION OF GRADED INDEX LIGHT GUIDES

BACKGROUND

The present disclosure generally relates to formation of optical elements with refractive indices that vary spatially in at least one dimension. More specifically, the present disclosure relates to a method and system for producing an optical waveguide, also known as a light guide, that has a smoothly varying refractive index. Optical waveguides have many uses. One type of optical waveguide is a graded index lens, which is commonly used for transferring an image or a beam of light from one location to another. Graded index lenses generally have an index that is highest in the center of the lens, and then gradually decreases radially outwards. Thus, the change in index occurs along two dimensions. For example, if the lens lies along the x-y plane of an x-y-z coordinate system, the index might vary in both the x and y directions. Besides graded index lenses, optical waveguides that vary in only one dimension also have many practical applications. However, conventional methods for manufacturing graded index lenses tend to be complicated and are not particularly suited for producing an index profile that varies in only one dimension. Additionally, these conventional methods tend to produce lenses that are poor at guiding light along the thickness direction. For example, graded index lenses produced by co-extrusion of polymer layers have much less scatter for light propagating at near-perpendicular angles to the plane of the layers, but very high scatter for light propagating along the layers. Accordingly, there is a need for techniques for reliably producing optical waveguides with refractive index profiles that vary in one dimension.

SUMMARY

The present disclosure relates generally to molding processes for producing optical elements. More specifically, and without limitation, this disclosure relates to extrusion molding a plurality of liquids with different refractive indices to form a multi-layer structure that is cured to form a solid optical element with a refractive index that varies in at least one dimension. A liquid refers to a non-gaseous material that behaves according to fluid dynamics, having no fixed shape, but having a substantially fixed volume. Embodiments are described in which liquids are cured into a solid state. For purposes of this disclosure, intermediate states with at least some degree of fluid flow are considered liquid states. Liquids can be pure substances or mixtures of two or more substances, including mixtures of different liquids.

In some embodiments, the optical element is produced by introducing a plurality of liquids, including a first liquid and a second liquid, into respective inlets of a mold. The inlets are connected to a channel that extends to an outlet of the mold, the channel is tapered towards the outlet, and the first and second liquids have different refractive indices. The first and second liquids partially diffuse into each other inside the channel to form a multi-layer structure. The multi-layer structure is extruded through the outlet, onto a substrate. The first and second liquids are then cured, thereby forming a solid optical element having a spatially varying refractive index profile in at least one dimension.

In some embodiments a system is used to produce an optical element, the system including a mold, a dispensing device, at least one curing device, and a controller. The mold includes a plurality of inlets, an outlet, and a channel that is tapered towards the outlet. The dispensing device is operable to introduce a plurality of liquids, including a first liquid and a second liquid, into respective inlets of the mold. The first and second liquids have different refractive indices. The controller is configured to automate the operation of the dispensing device to control the introduction of the first and second liquids, such that the first and second liquids partially diffuse into each other inside the channel to form a multi-layer structure, and such that the multi-layer structure is extruded through the outlet onto a substrate. The controller is further configured to automate the operation of the at least one curing device to cure the first and second liquids, thereby forming a solid optical element having a spatially varying refractive index profile in at least one dimension.

In some embodiments, the optical element is a light guide produced by introducing at least a first liquid, a second liquid, and a third liquid into respective inlets of the mold. The liquids are arranged so that a central layer of the multi-layer structure has the highest refractive index, the refractive indices of the remaining layers are symmetric about the central layer, and the refractive indices progressively decrease between layers, from the central layer outward. The refractive index profile may be parabolic in exactly one dimension.

BRIEF DESCRIPTION OF THE DRAWINGS

Illustrative embodiments are described with reference to the following figures.

The figures depict embodiments of the present disclosure for purposes of illustration only. One skilled in the art will readily recognize from the following description that alternative embodiments of the structures and methods illustrated may be employed without departing from the principles, or benefits touted, of this disclosure.

In the appended figures, similar components and/or features may have the same reference label. Further, various components of the same type may be distinguished by following the reference label by a dash and a second label that distinguishes among the similar components. If only the first reference label is used in the specification, the descrip-

3 tion is applicable to any one of the similar components having the same first reference label irrespective of the second reference label.

DETAILED DESCRIPTION

In the following description, for the purposes of explanation, specific details are set forth in order to provide a thorough understanding of certain inventive embodiments. However, it will be apparent that various embodiments may be practiced without these specific details. The figures and description are not intended to be restrictive.

This disclosure relates generally to systems and methods for producing optical elements. More specifically, and without limitation, this disclosure relates to systems and methods for producing optical elements having refractive indices that vary spatially in at least one dimension. The optical elements may be formed using a combination of monomeric resins or other liquids that, when cured, form a polymeric waveguide. The refractive index profile can be produced in one dimension or two dimensions in various and/or arbitrary shapes.

Figure 1:
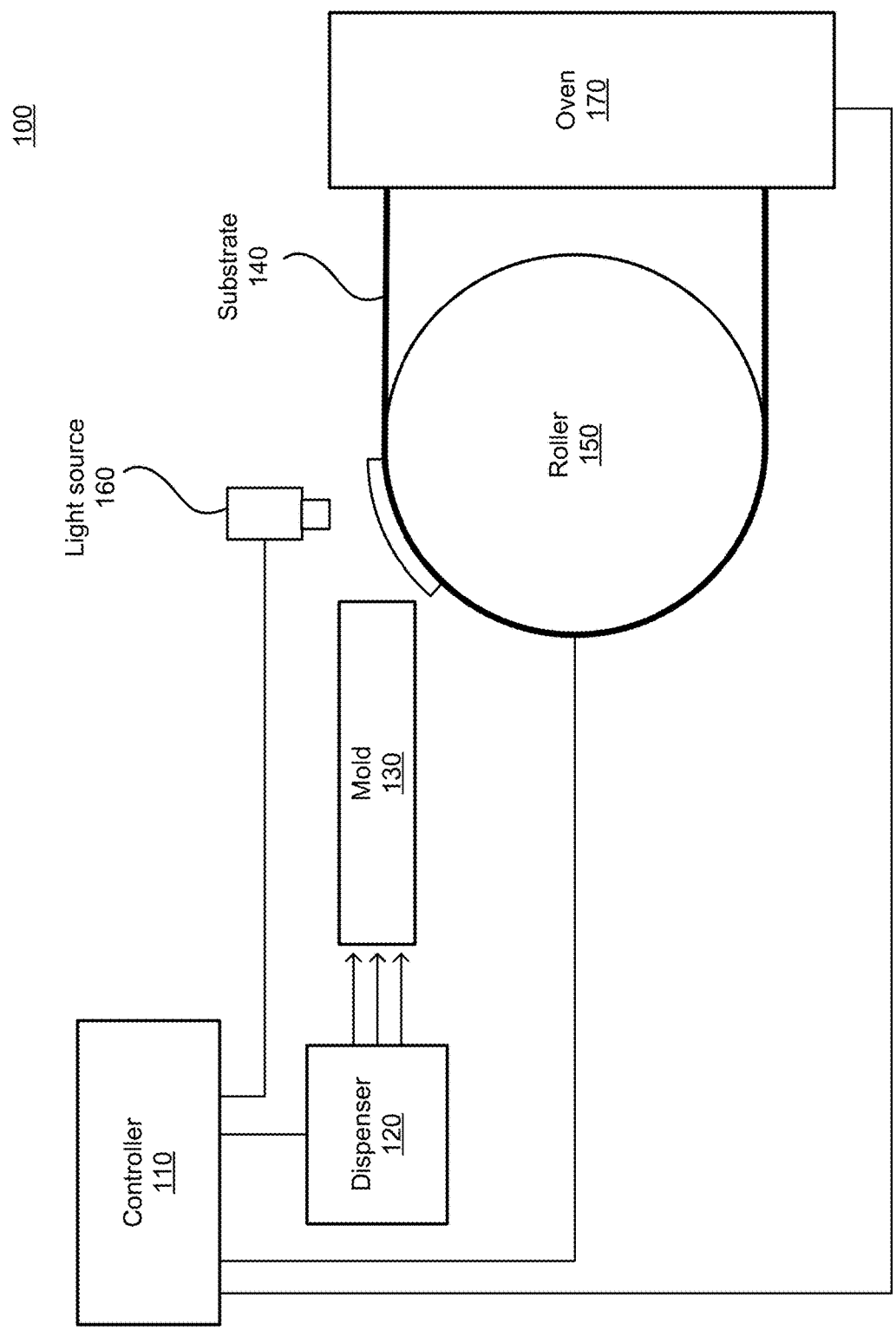
FIG. 1 is a block diagram of an embodiment of a system for producing an optical waveguide.

FIG. 1 is a block diagram of an embodiment of a system 100 for producing an optical waveguide. The system includes a controller 110, a dispenser 120, a mold 130, a substrate 140, a roller 150, a light source 160, and an oven 170. The controller 110 may be implemented in hardware, software, or a combination thereof. In one embodiment, the controller 110 includes a microprocessor executing instructions stored on a computer-readable medium. In another embodiment, the controller 110 includes a dedicated circuit hardwired to control various components of the system 100. The controller 110 may receive feedback signals from one or more system components to form an open or closed feedback loop in which control of the system components is adjusted, for example, based on information indicating a status of a controlled component. The feedback signals may, for example, be produced by thermometers, timers, microphones, video cameras, and other sensor equipment.

The dispenser 120 is a device that introduces a plurality of liquids into the mold 130. The dispenser 120 introduces the liquids under the control of controller 110. Alternatively, in some embodiments the dispenser 120 may be programmed or otherwise configured to operate autonomously. The dispenser 120 may include a reservoir containing a liquid with a known refractive index. The dispenser may be configured to form a plurality of liquids with different indices, for example, by adding an index modifying agent, such as nanoparticles, to a liquid to form, as output of the dispenser, a plurality of liquids, each with a different refractive index. Thus, the liquids can be formed from the same base material. Alternatively, the dispenser 120 may include multiple reservoirs with pre-formed liquids of different indices. In some embodiments, the dispenser 120 may include a mixing apparatus that mixes two or more liquids of different indices to form an output liquid having a desired index.

The mold 130 is a hollow object including an input side and an output side. Example embodiments will be described in which the mold has, on its input side, a plurality of inlets. A channel couples the inlets to an outlet on the output side. The channel may be tapered towards the outlet. The dispenser 120 may introduce the liquids into the mold by various methods including injection, gravity feeding, and pumping. As will be described, the liquids combine in the channel by partial diffusion to form a multi-layer structure that is further processed to produce a completed waveguide. The multi-layer structure is extruded through the outlet onto substrate 140.

The substrate 140 is a flat surface that is substantially rigid in comparison to the multi-layer structure. However, the substrate 140 may be sufficiently flexible so as to conform to a surface of the roller 150, forming a conveyer belt that transports the multi-layer structure into the oven 170. The substrate 140 may include an anti-stick material matched to the material characteristics of the multi-layer structure. For example, if the multi-layer structure is formed of resins, the substrate 150 may be coated with a polymer repelling material to facilitate removal after curing.

The roller 150 spins at a specific rate and is positioned near the output side of the mold to receive the multi-layer structure onto the substrate 140. In some embodiments the spin rate is adjustable, for example, by controller 110.

The multi-layer structure may be cured to form a solid waveguide using light from light source 160 which may be implemented, for example, as an ultraviolet lamp. Light source 160 produces actinic radiation that triggers hardening of the multi-layer structure. The system 100 may include a plurality of light sources placed at different locations, including different positions along the substrate. In some embodiments, different light sources may target specific layers. One light source might produce light that cures a layer corresponding to a first liquid, while a second light source produces a light that cures a different layer. Each light source may be controlled by controller 110 to, for example, adjust an intensity of the light output. Although shown as facing a top (front) surface of the multi-layer substrate, light sources or other curing elements may also face a bottom (back) surface of the multi-layer substrate. For example, curing elements may be embedded within or located beneath the substrate.

Alternative photo curing methods include blue light and electron beams. Other methods of curing may be combined with, or used as alternatives to, photo curing. For example, the oven 170 may be a convection oven operated at a temperature sufficient to dry and/or thermally cure the multi-layer structure, thereby forming a solid waveguide.

Figure 2:
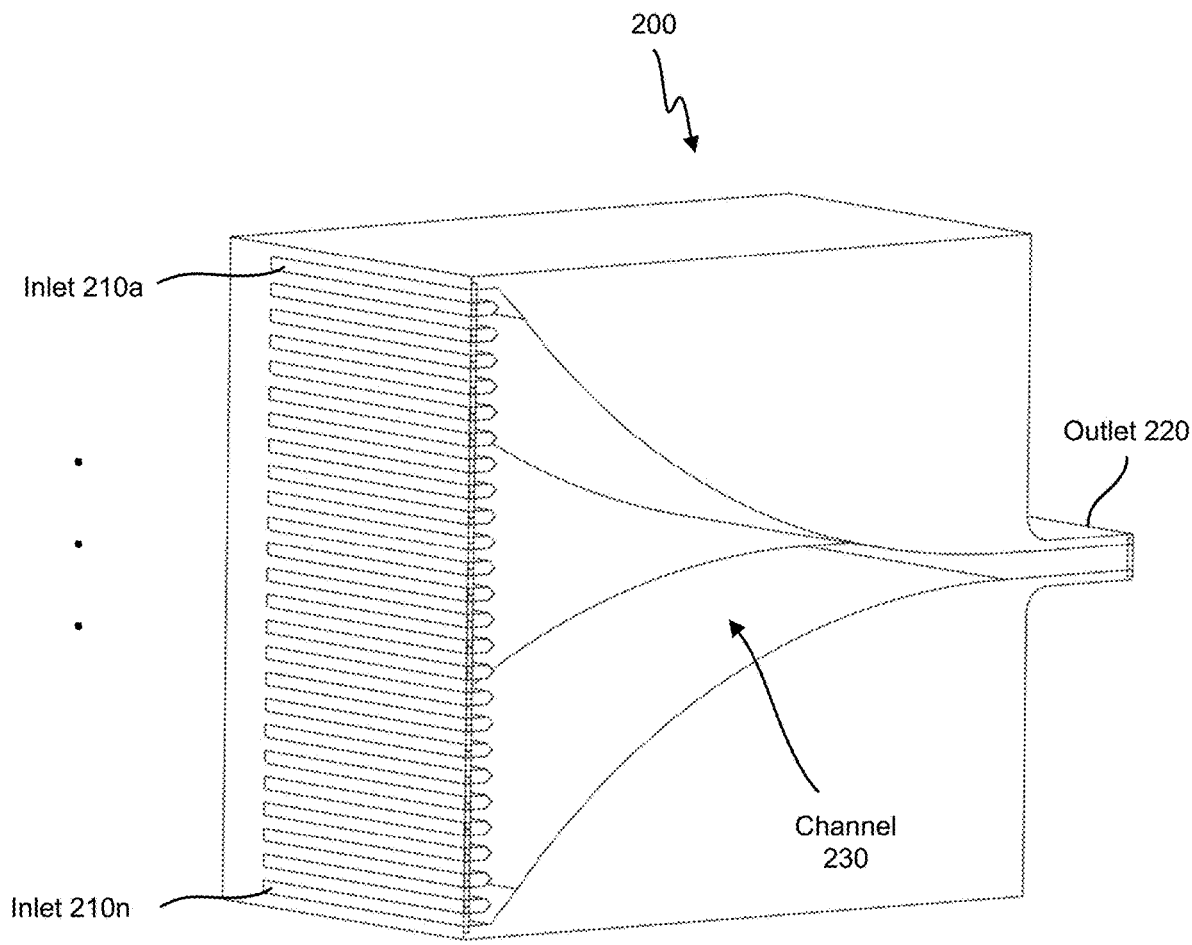
FIG. 2 illustrates a perspective view of an embodiment of a mold.
Figure 3A:
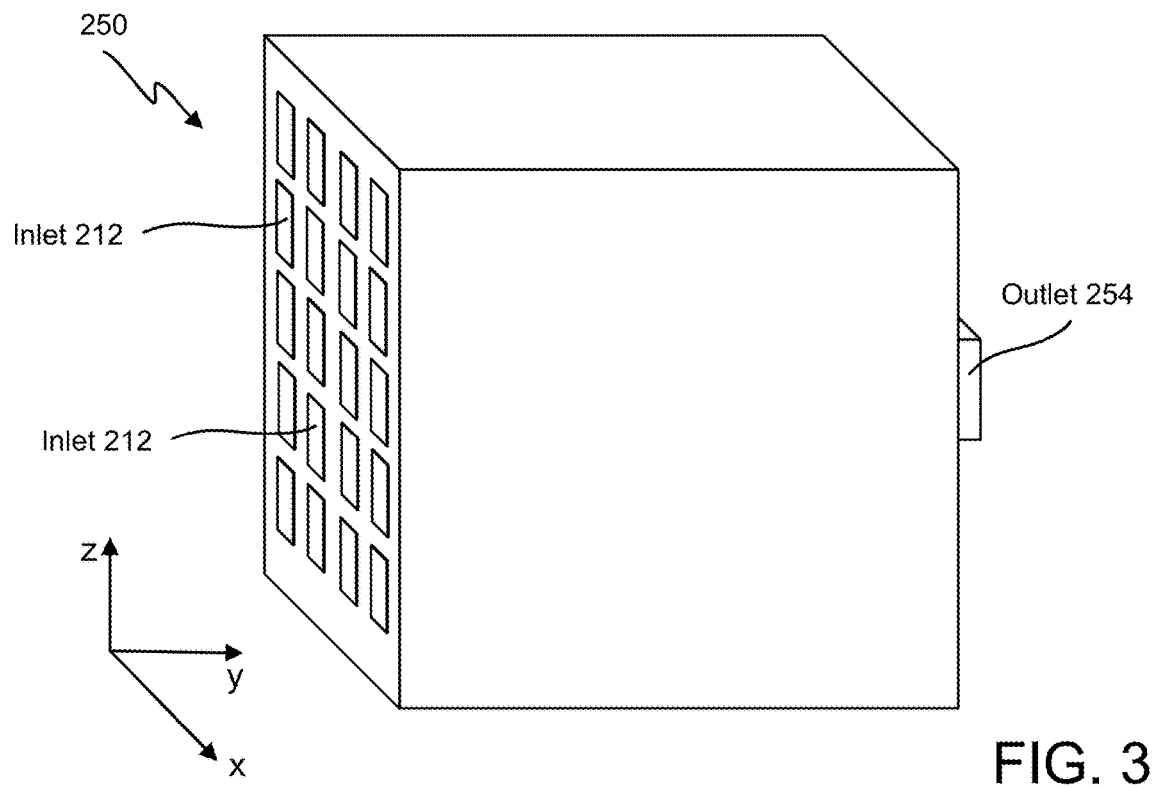
FIG. 3A illustrates a perspective view of an embodiment of a mold.
Figure 3B:
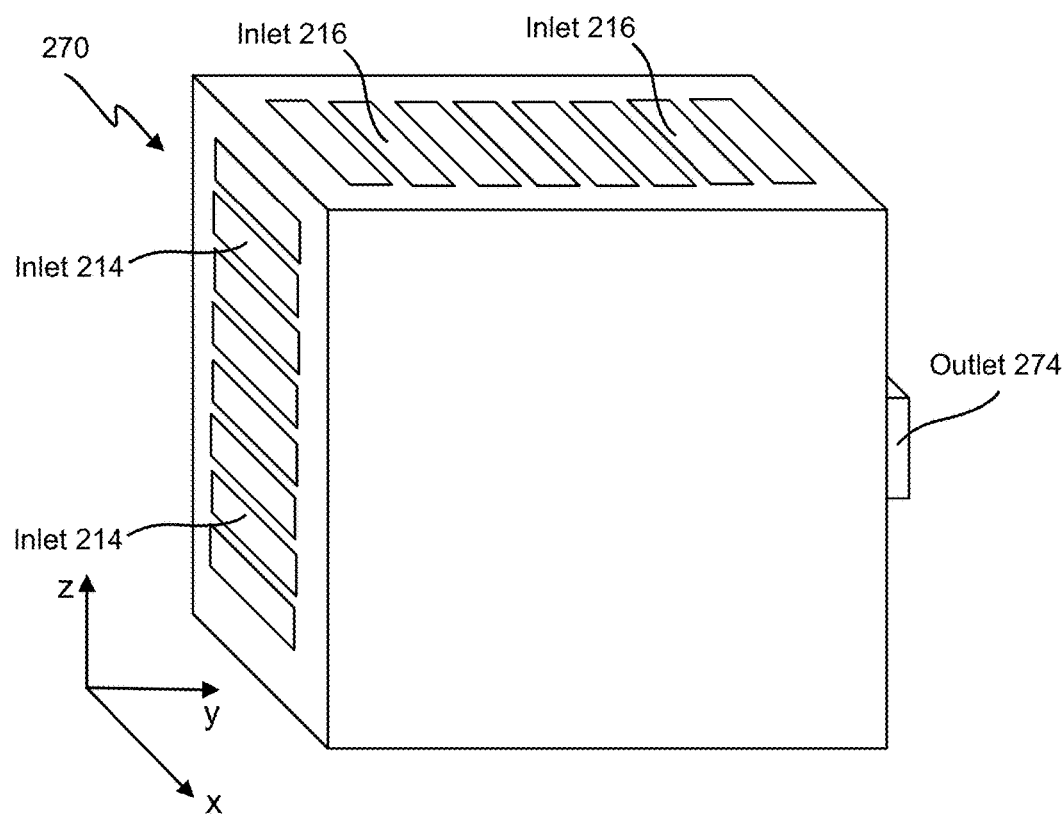
FIG. 3B illustrates a perspective view of an embodiment of a mold.

FIG. 2 illustrates a perspective view of an embodiment of a mold 200. The mold 200 has a substantially rectangular shape, with a plurality of inlets 210a to 210n located on one side, and an outlet 220 on an opposing side. The mold 200 includes a channel 230 connecting the inlets 210 to the outlet 220. FIG. 2 shows hidden details of the channel 230 that are not visible from the exterior of the mold. For discussion purposes, the mold is shown relative to an x-y-z coordinate system. The inlets 210 may be slit shaped, with the shorter side being along the z-direction and the longer side along the x-direction. However, the inlets can be of other shapes and sizes, including circular, and need not all be of the same shape or size. In the embodiment of FIG. 2, the inlets 210 are arranged in a row along the z-axis. As will be explained, this arrangement facilitates precise control over the refractive index profile along one dimension, in this instance the z-dimension. In some embodiments, the mold may include an inlet structure that facilitates creation of a two-dimensional index profile. For example, instead of one row, the inlets may be arranged in a grid along the z and x-axes. FIG. 3A shows an embodiment of a mold 250 in accordance with such an arrangement. The mold 250 includes a grid of inlets 212 and an outlet 254. In some embodiments, a second set of inlets may be added to another side of the mold, such as on the top side along the y-axis. For example, FIG. 3B shows an embodiment of a mold 270 with inlets 214 arranged in a first row along the z-axis, inlets 216 arranged in a second row along the y-axis, and an outlet 274.

Referring back to FIG. 2, the outlet 220 may be of the same shape as the inlets 210. In some embodiments, the opening of the outlet 220 is significantly smaller than the combined openings of the inlets 210. The smaller outlet opening operates to compress any materials introduced into the inlets. The channel 230 can also be shaped to aid in compression. For example, FIG. 2 shows the channel 230 as being tapered towards the outlet 220 in a funnel shape. In FIG. 2, the outlet 220 has a rectangular opening. However, other outlet shapes are possible depending on a desired shape of the waveguide to be produced. For example, a circular outlet may be used to form a cylindrical waveguide. By way of example, the ratio of the width (x-dimension) to the height (z-dimension) of the outlet 220, and therefore the resulting waveguide, may be at least ten. A planar waveguide can be formed by extruding a sufficient amount of material, for example, enough material so that the ratio of the length (y-dimension) to the height (z-dimension) of the wavelength is also at least ten.

Figure 4:
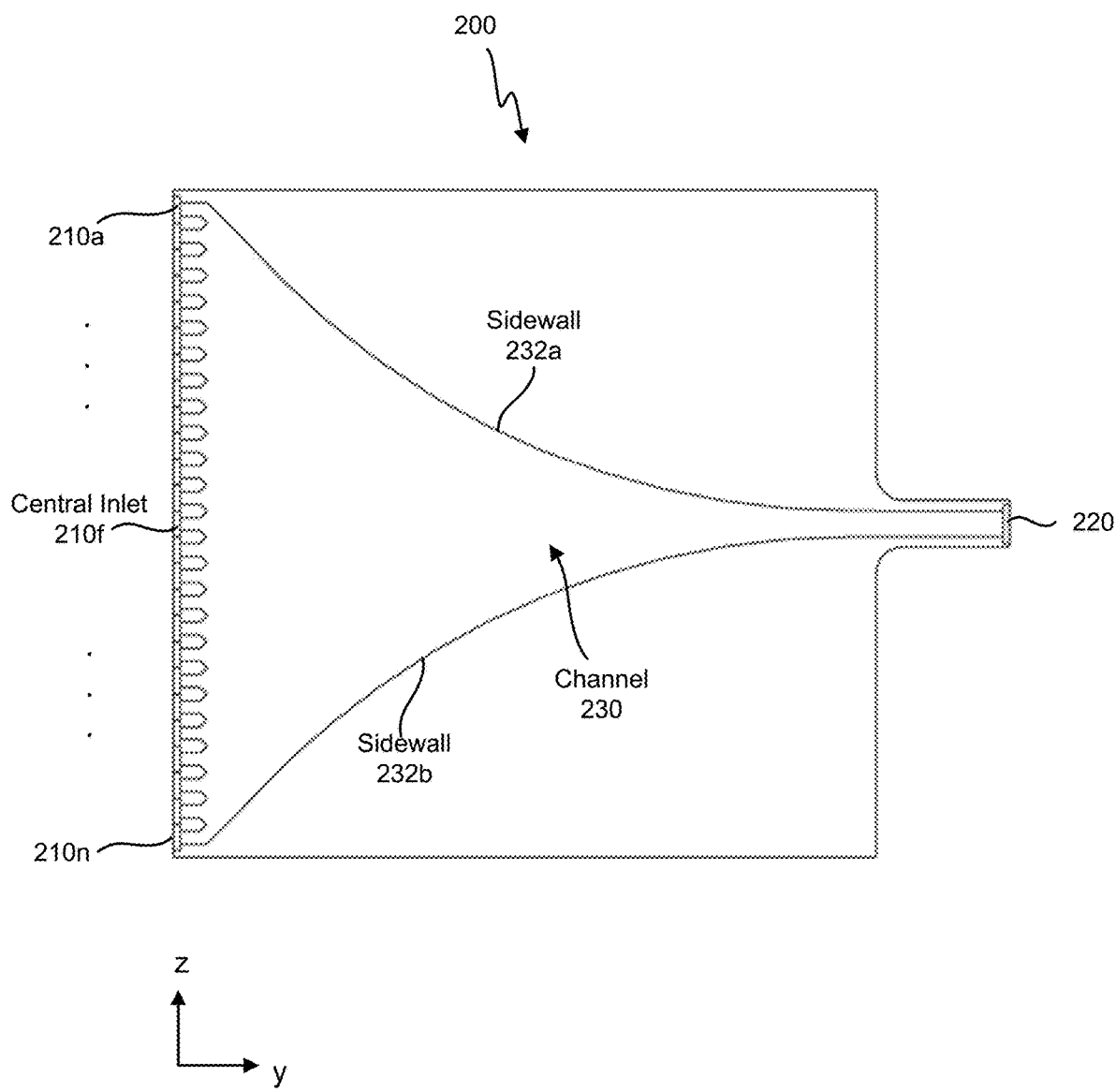
FIG. 4 illustrates a cross section of the mold in FIG. 2.

FIG. 4 illustrates a cross section of the mold 200, which has twenty-five inlets including a central inlet 210*f*. The outermost inlets 210*a* and 210*n* are adjacent to respective sidewalls 232*a* and 232*b* of the channel 230.

Figure 5:
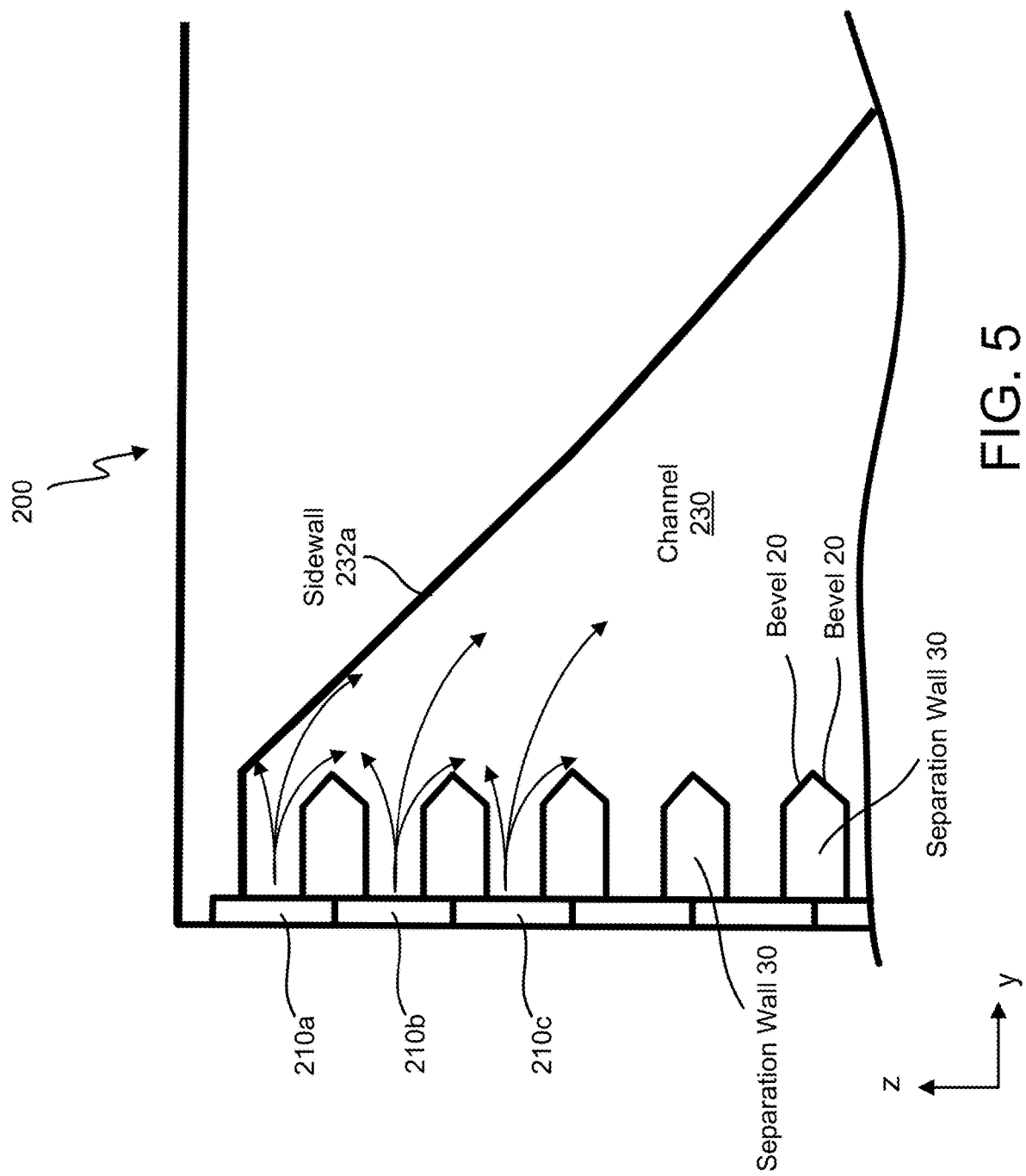
FIG. 5 illustrates liquid flow in the mold of FIG. 2.

FIG. 5 illustrates liquid flow in the mold 200. For simplicity, only a top corner of the mold is shown. Each inlet 210 receives a respective liquid. In the illustrated embodiment, the liquids are guided into the channel by separation walls 30. The walls 30 define the inner surfaces of the inlets. Each wall 30 separates an adjacent pair of inlets and is oriented substantially perpendicular to the openings of the inlets. The walls include bevels 20 that join to form a tip that directs liquids from adjacent inlets towards each other. As shown, a portion of the liquid from inlet 210*a* contacts and is guided by sidewall 232*a*. A separation wall directs another portion of liquid from inlet 210*a* and a portion of liquid from inlet 210*b* towards each other. Similarly, another separation wall directs a second portion of liquid from inlet 210*b* and a portion of liquid from inlet 210*c* towards each other. In this manner, the liquids introduced into the mold 200 are guided along the channel 230 to contact each other before exiting the channel. Depending on their properties, the liquids may combine to varying degrees. In one embodiment, the liquids immediately begin to mutually diffuse into one another upon contact. At the interface between two liquids, a region is formed that has a refractive index somewhere in between that of the original liquids.

Figure 6:
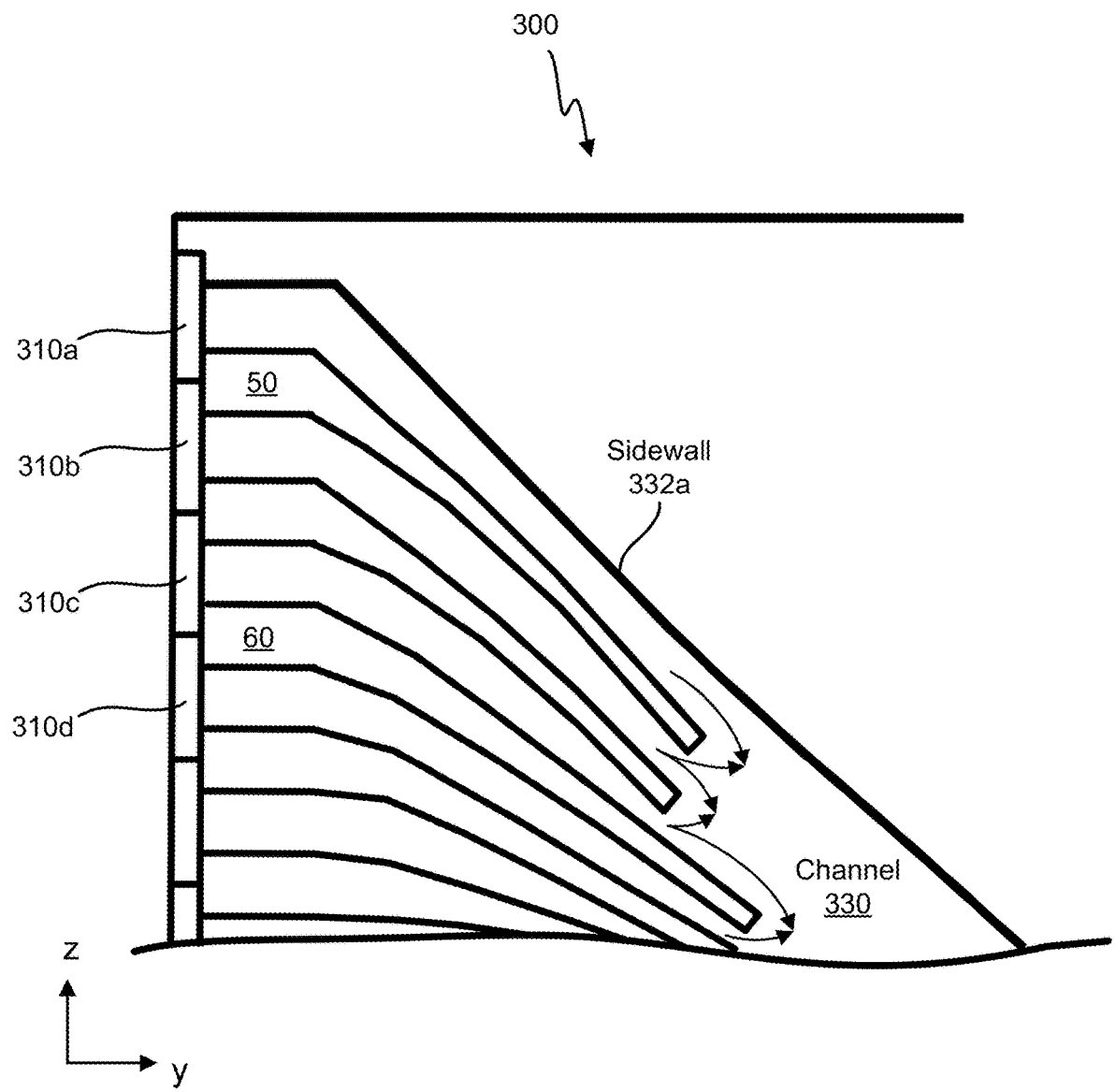
FIG. 6 illustrates a cross section of an embodiment of a mold.

FIG. 6 illustrates a cross section of an embodiment of a mold 300. The mold 300 includes inlets 310 that have the same opening shape as the inlets 210 in FIG. 5. However, the separation walls extend farther into channel 330 and are curved to generally follow the direction of the channel 330. Additionally, the separation walls are of varying lengths. For example, a separation wall 50 between inlets 310*a* and 310*b* is shorter than a separation wall 60 between inlets 310*c* and 310*d*. Consequently, liquids from inlets 310*a* and 310*b* contact before liquids from inlets 310*c* and 310*d*.

Figure 7:
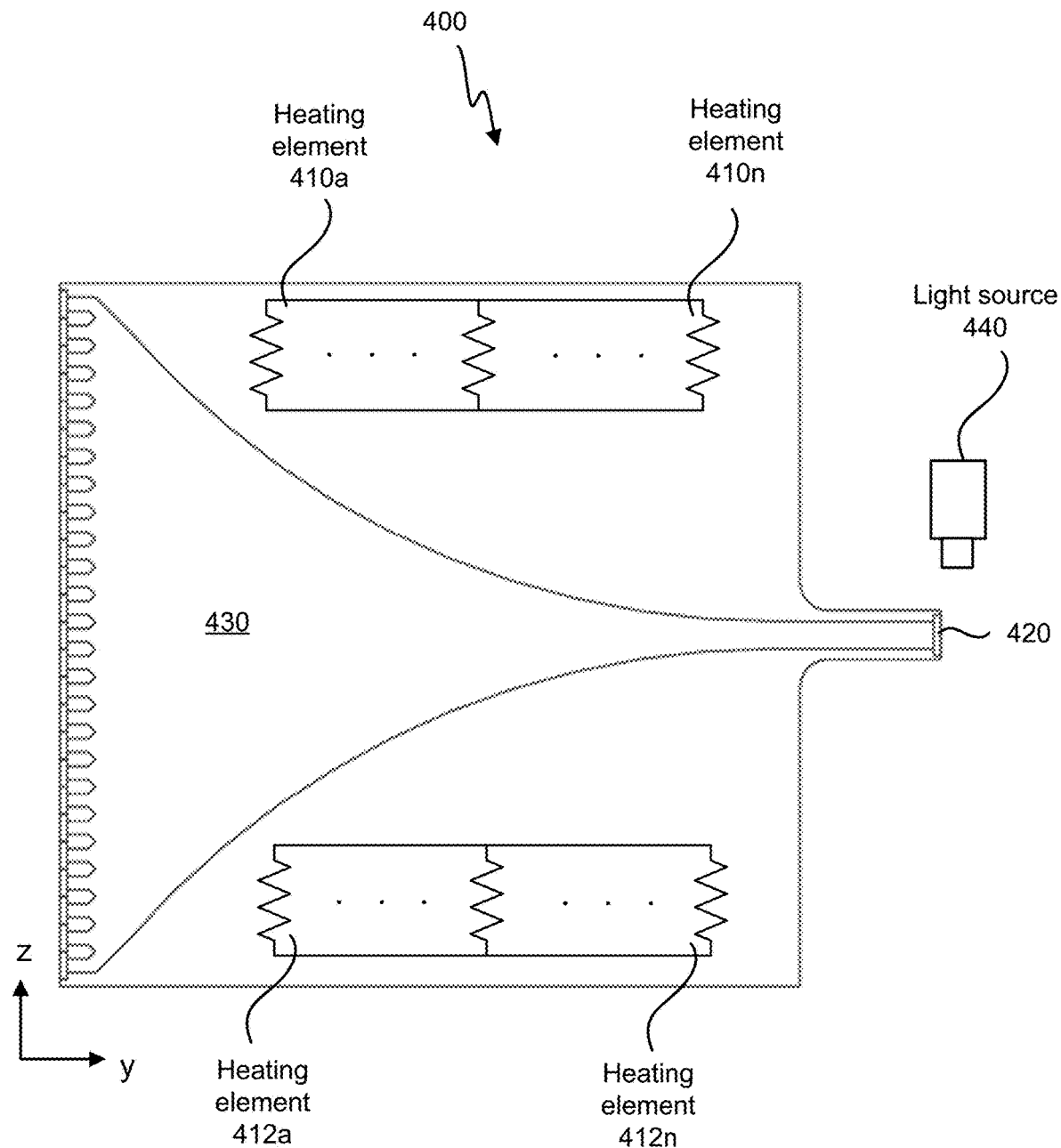
FIG. 7 illustrates a cross section of an embodiment of a mold.

FIG. 7 illustrates a cross section of an embodiment of a mold 400, which includes a first set of heating elements 410 and a second set of heating elements 412. For illustration purposes, the heating elements are represented by resistors. The heating elements 410 are arranged along a top side of the mold 400, while the heating elements 412 are arranged along a bottom side. The heating elements 410 and 412 can be operated to partially cure liquids in the channel 430. Alternatively, the heating elements 410 and 412 can be operated to warm the liquids in the channel 430, thereby influencing diffusion rates without initiating curing. In this way, the refractive index profile may be set according to temperatures at different points along the channel and/or a temperature of the channel over time. The heating elements may be controlled individually or as a group. After extrusion through outlet 420, the liquids are cured by light source 440. In some embodiments, the liquids are cured in two or more stages. For example, in FIG. 7, partial curing by the heating elements 410, 420 and/or the light source 440 will slow the diffusion process, adding an additional degree of control over the extent to which the liquids diffuse. In some embodiments, the liquids are heat cured inside the mold, followed by full curing by light. Other curing processes are possible, including partial curing followed by full curing using the same type of curing mechanism (e.g., heat).

Figure 8:
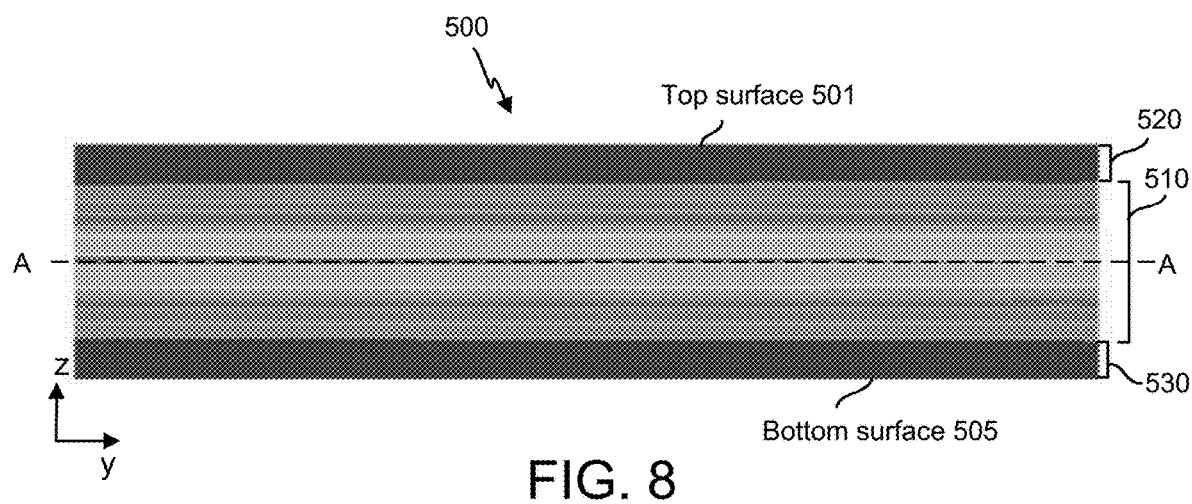
FIG. 8 illustrates a cross section of an embodiment of an optical waveguide.

FIG. 8 illustrates a cross section of an embodiment of an optical waveguide 500 produced in accordance with a system or method as described in this disclosure. The waveguide 500 has a top surface 501 and a bottom surface 505, and was formed by co-diffusion of a first liquid with a higher refractive index and a second liquid with a lower refractive index. The first liquid was introduced into a central inlet of a mold having three inlets, while the second liquid was introduced into the two adjacent inlets on both sides of the central inlet. The waveguide 500 includes a mixed layer 510 and distinct layers 520 and 530. The layers 520 and 530 correspond entirely to the second liquid, while layer 510 is a mixture of the first and second liquids. The refractive index varies spatially in the z-dimension.

Figure 9:
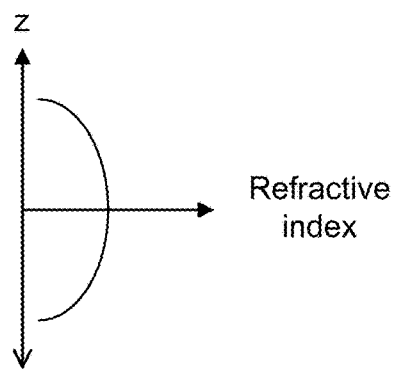
FIG. 9 illustrates an example refractive index profile.

FIG. 9 illustrates an example refractive index profile that is similar to the profile of the waveguide 500. The origin of the z-axis is at the center (midplane) of the waveguide, where the refractive index is highest. The midplane is halfway between the top and bottom surfaces of the waveguide, and represented in FIG. 8 by dashed line A-A. The index gradually becomes lower when moving away from the center, forming a parabolic profile. As an example, the refractive index may vary by less than $0.1/\mu m$. For a parabolic profile, the refractive index preferably varies according to the formula $n=n_0 (1-AZ^2/2)$, where A is a positive coefficient, Z is displacement from the midplane of the waveguide, n is the refractive index and $n_0$ is the refractive index at the midplane.

Figure 10:
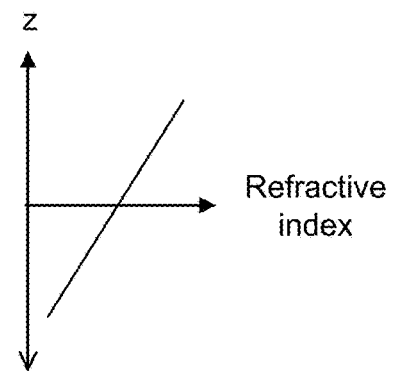
FIG. 10 illustrates an example refractive index profile.

FIG. 10 illustrates an example of a linear refractive index profile. Like the parabolic profile in FIG. 9, the linear profile varies in the z-dimension. However, the linear profile does not peak in the center of the waveguide, but instead increases continuously from the bottom to the top of the waveguide. FIGS. 9 and 10 are examples of spatially varying profiles in one dimension. One of ordinary skill in the art will understand that other profiles in one and two dimensions are also possible based on the embodiments described herein.

Figure 11:
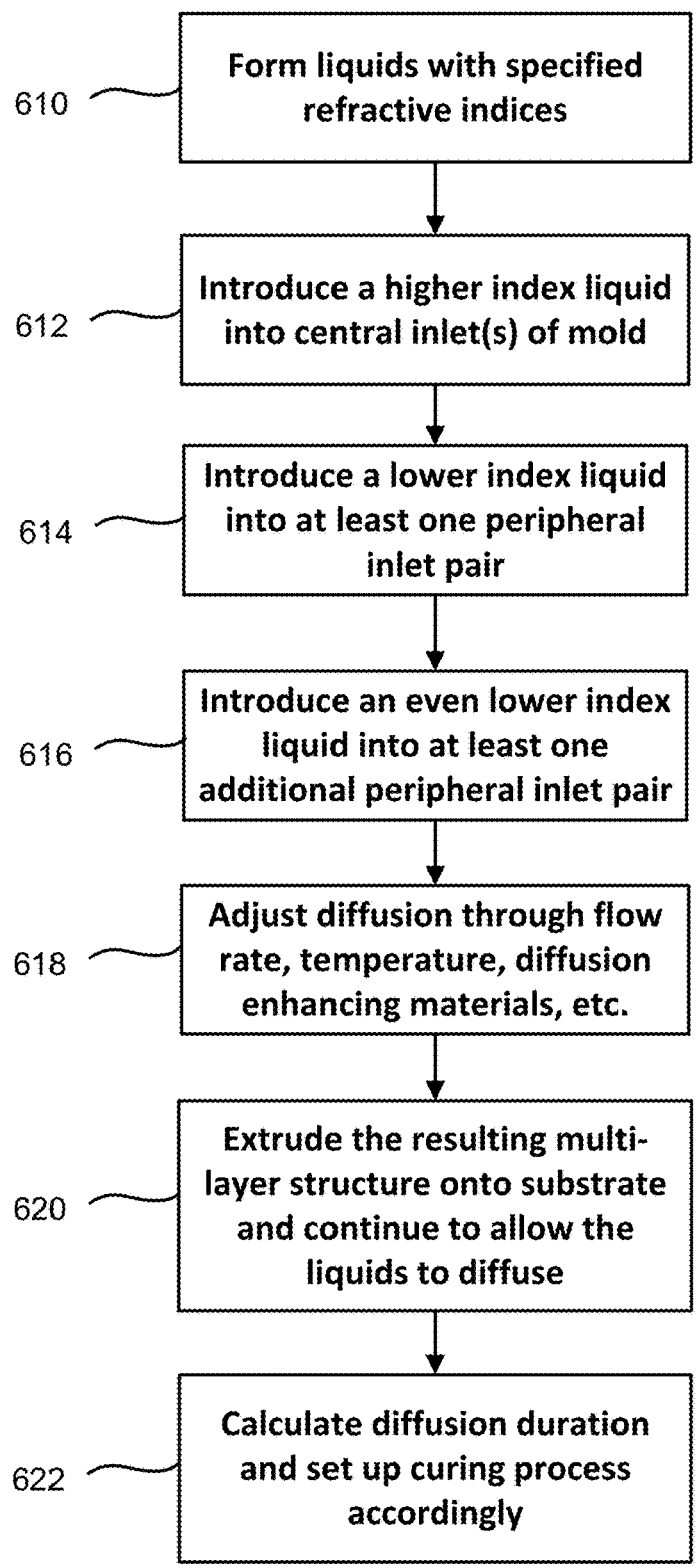
FIG. 11 is a flowchart of an embodiment of a method for producing an optical waveguide.

FIG. 11 is a flowchart of an embodiment of a method 600 for producing an optical waveguide. Although shown as a sequence of steps, it will be understood that in other embodiments certain steps may be performed simultaneously, in a different order, or omitted altogether. The method 600 begins at step 610 and will be described in connection with the system 100 of FIG. 1, but may be performed using other system embodiments. In step 610, a plurality of liquids are formed, the liquids having specified refractive indices. The liquids may be formed prior to storage in the dispenser 120. Alternatively, as mentioned earlier, the dispenser 120 may include a mechanism for forming the liquids internally, for example by mixing liquids or adding index modifying materials. As mentioned, the liquids may be curable resins, in particular monomeric resins that form polymers when cured. Examples of suitable resins include a silicone, a fluorosilicone, an acrylate, a urethane, an ester, an imide, an epoxy, and a thiol containing monomer or a thiol containing oligomer. Different types of resins may be used in combination with each other. Depending on the resins selected, the resins may diffuse into each other to form copolymers, mixtures of polymers, or discrete layers of polymers, when fully cured.

In step 612, a higher index liquid is introduced into at least one central inlet of the mold. Depending on a desired thickness of a high index region, the controller 110 may instruct the dispenser 120 to introduce the higher index liquid into a varying number of central inlets.

The thickness increases with the number of central inlets used.

In step 614, a lower index liquid is introduced into at least one peripheral inlet pair located on opposite sides of the central inlet(s). On one side, the peripheral inlets extend from the topmost central inlet towards the top of the mold. On the opposite side, the peripheral inlets extend from the bottommost central inlet towards the bottom of the mold. This forms a three layer sandwich, with a pair of layers having lower refractive indices on opposite sides of a central layer having a higher refractive index.

In step 616, an even lower index liquid is introduced into at least one additional peripheral inlet pair. The additional peripheral inlets are positioned in a similar manner as described in step 614, but with the peripheral inlets from step 614 being intervening inlets between the additional peripheral inlets and the central inlet(s). This forms a five layer sandwich with a more gradual change in refractive index compared to the three layer sandwich from step 614. At the end of both steps 614 and 616, the multi-layer structure has a central layer with the highest refractive index, with the remaining layers being symmetric about the central layer, and the refractive indices progressively decrease between layers, from the central layer outward.

Step 616 may be repeated with additional liquids of successively decreasing refractive index to form additional layer pairs. Thus, the total number of layers may range from at least three to perhaps nine or more. As with the introduction of the higher index liquid, a thickness of the region formed by each lower index liquid may be set based on the number of inlets into which the lower index liquids are introduced.

In step 618, the diffusion of the liquids is adjusted through one or more parameters such as flow rate, temperature, and addition of diffusion enhancing materials. For example, the controller 110 may set a rate at which a first liquid is introduced to be different than a rate at which a second liquid is introduced. Flow rate may also be set by changing the viscosity of the liquids, for example using thickening agents, or thinning agents such as solvents. Besides solvents, other types of diffusion enhancing materials can be added to liquids, for example plasticizers. Another way to set the flow rate is through the speed of the roller 150. In some embodiments, different liquids may have different initial temperatures. The temperature of a liquid may be adjusted as the liquid travels through the channel, for example using a mold that includes embedded heating elements, as shown in FIG. 7. Heating a liquid will increase its diffusion rate.

In step 620, the multi-layer structure is extruded onto the substrate 140. The liquids may continue to diffuse after extrusion. In some embodiments, the substrate 140 may be heated and its temperature adjusted to set the refractive index profile, for example using heating elements similar to those described with respect to FIG. 7.

In step 622, the controller 110 calculates the diffusion duration, which may be expressed, for example, as an amount of time elapsed since introduction of the liquids into the mold. Based on the values of other system parameters mentioned earlier, such as flow rate and temperature, the amount of diffusion that occurs as a function of time can be estimated. The curing process is then set up accordingly, for example, by setting the temperature of the oven 170 and/or a length of time spent in the oven 170 so that full curing, and thus the end of diffusion, is reached within the calculated diffusion duration. The multi-layer structure may be subject to additional processing prior to full curing, for example removal of stabilizer materials that may affect transparency or color of the waveguide, or addition of optical elements such as an embedded mirror. Example stabilizers include hydroquinone, hydroquinone methyl ether, and dimethyl t-butyl phenol. The stabilizers may be removed in various ways, including by distillation, chemical reaction, or using a selective absorbent such as activated alumina.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

Figure 12:
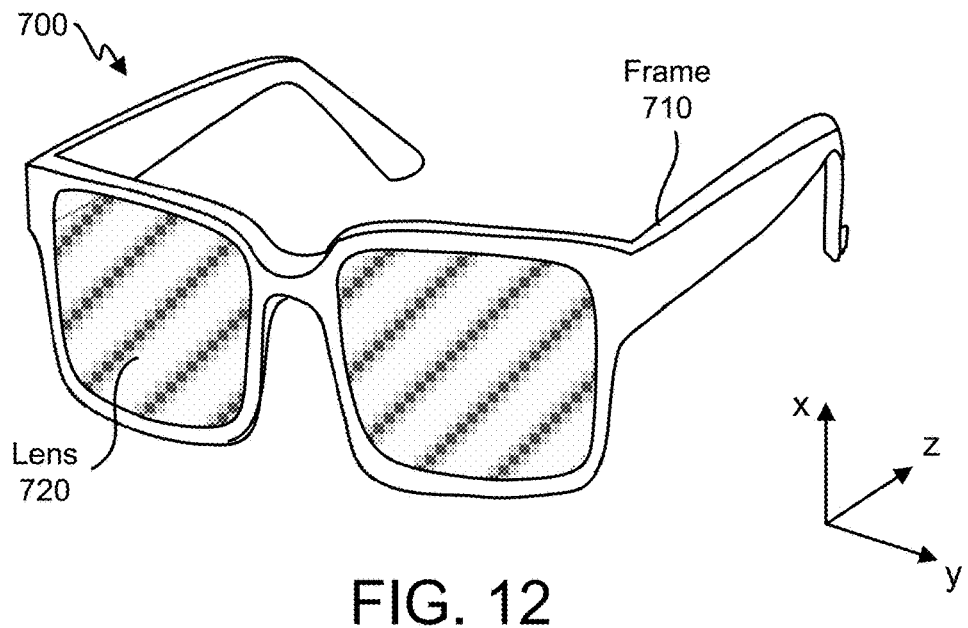
FIG. 12 illustrates an embodiment of an eyewear device including an optical waveguide.

FIG. 12 illustrates an embodiment of an eyewear device 700 including an optical waveguide. The eyewear device 700 may be configured to present media to a user. Examples of media presented include images, video and/or audio. In some embodiments, audio is presented via an external device (e.g., speakers and/or headphones) that receives audio information from the eyewear device 700, a console, or both, and presents audio data based on the audio information. The eyewear device 700 may be configured to operate as a VR display. In some embodiments, the eyewear device 700 operates as an AR display and/or MR display.

The eyewear device 700 includes a frame 710 and a lens 720. The frame 710 is coupled to one or more optical elements. The lens 720 includes a display layer configured to display images. In some embodiments, the display layer comprises a waveguide display assembly for directing light from one or more images to an eye of the user. In addition to the waveguide display assembly, the eyewear device 700 may include a second waveguide assembly, as shown in FIG. 13.

Figure 13:
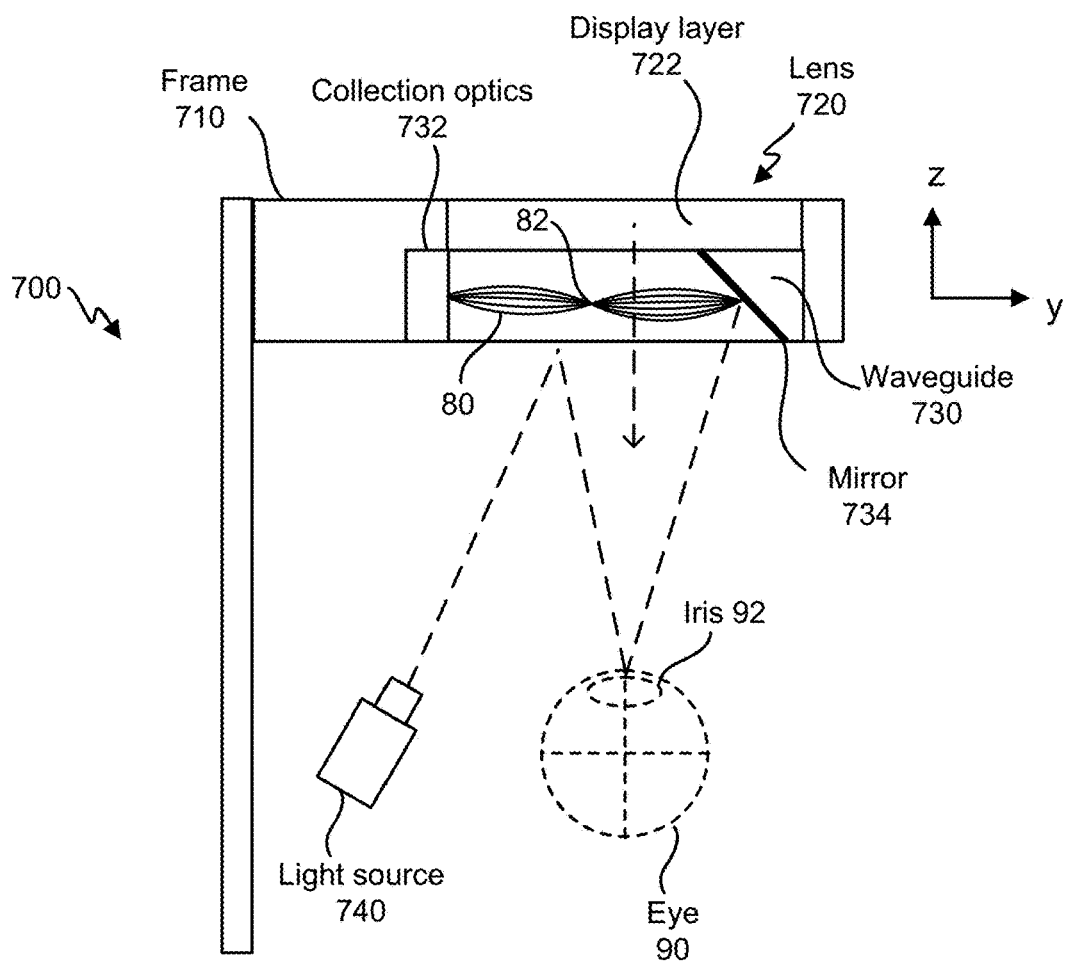
FIG. 13 illustrates a cross section of an embodiment of an eyewear device including an optical waveguide.

FIG. 13 illustrates a cross section of a portion of the eyewear device 700. The lens 720 includes a display layer 722 with at least one waveguide display assembly (not shown) that is configured to guide an image from the display layer towards an eye 90 of the user. The eyewear device 700 also includes a waveguide assembly comprising a waveguide 730 produced in accordance with an embodiment described herein, a mirror 734 and collection optics 732. The mirror 734 is configured to capture an image of the eye 90. In some embodiments, the waveguide assembly forms an anamorphic image. For example, the mirror 734 may be cylindrical or curved to stretch the eye image in one or more dimensions. The eye image may be formed using a light source 740 mounted, for example, somewhere on the frame 710. As shown, the light source 740 may illuminate a portion of the waveguide 730, producing a reflection that bounces off an iris 92 or a cornea of the eye towards the mirror 734. In some embodiments, the light source 740 may be positioned to directly illuminate the eye.

In FIG. 13, the eye image is figuratively shown as a bundle of light rays 80. If the waveguide 730 has a parabolic refractive index profile that varies in the z-dimension, then the light rays 80 will be guided towards collection optics 732, following a curved path that crosses the midplane of the waveguide 730 to eventually bend back in the opposite direction, so that each light ray has a sinusoidal trajectory. Depending on the length of the waveguide, the light rays may converge one more times at crossing points, such as point 82, before reaching the end of the waveguide, where the rays are received by collection optics 732.

The collection optics 732 may include various optical elements for capturing and processing the light rays. For example, the collection optics 732 may include a light sensor such as a charge-coupled device (CCD) array or a set of photodiodes. If the eye image is anamorphic, the collection optics may include one or more lenses or filters to recover a 1:1 image. The collection optics 732 may produce electrical signals corresponding to the eye image. The signals can be processed by a circuit to track movement of the eye 90. The tracking circuit is preferably onboard the eyewear device 700, but can be located externally.

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, and/or hardware.

Steps, operations, or processes described may be performed or implemented with one or more hardware or software modules, alone or in combination with other devices. In some embodiments, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations described. The apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

The language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A method for producing an optical element, comprising:
    forming a first liquid and a second liquid, wherein the first liquid and the second liquid have different refractive indices, and wherein forming the first liquid and the second liquid comprises forming both the first liquid and the second liquid by adding a refractive index modifying agent to a third liquid;
    after forming the first liquid and the second liquid, introducing the first liquid into a first inlet of a mold and the second liquid into a second inlet of the mold, wherein the first inlet and the second inlet are connected to a channel that extends to an outlet of the mold, wherein the channel is tapered towards the outlet, wherein each inlet of the mold is separated from an adjacent inlet by a wall that extends a certain distance into the channel to define a path for flow of liquid into the channel, wherein each path is curved to follow a direction of the channel, and wherein the first and second liquids partially diffuse into each other inside the channel to form a multi-layer structure;
    extruding the multi-layer structure through the outlet, onto a substrate; and
    curing the first and second liquids, thereby forming a solid optical element having a spatially varying refractive index profile in at least one dimension.

2. The method of claim 1, further comprising:
    setting the spatially varying refractive index profile by controlling rates at which the first and second liquids flow through the channel.

3. The method of claim 1, further comprising:
    setting the spatially varying refractive index profile by controlling at least one of: temperatures at different points along the channel, a temperature of the channel over time, and a temperature of the substrate.

4. The method of claim 1, wherein the first and second liquids each comprise a resin.

5. The method of claim 4, wherein each of the resins is one of a silicone, a fluorosilicone, an acrylate, a urethane, an ester, an imide, an epoxy, or a thiol containing monomer or oligomer.

6. The method of claim 1, further comprising:
introducing a diffusion enhancing material into at least one of the first and second liquids, wherein the diffusion enhancing material is a solvent or a plasticizer.

7. The method of claim 1, wherein the first and second liquids have different viscosities.

8. The method of claim 1, further comprising:
fully curing the first and second liquids after the step of extruding the multi-layer structure onto the substrate, wherein the first and second liquids continue to diffuse into each other until fully cured.

9. The method of claim 1, wherein the inlets of the mold are arranged in a row along one side of the mold, wherein the outlet is located at an opposite side of the mold, and wherein an opening of the outlet is smaller than a combined opening of the inlets of the mold.

10. The method of claim 1, further comprising:
introducing a fourth liquid with a refractive index different from that of the first liquid and the second liquid into a third inlet of the mold to form, in the multi-layer structure, three adjacent layers with progressively increasing or progressively decreasing refractive indices, wherein the third inlet is adjacent to the first inlet and the second inlet, and wherein a wall separating the first inlet from the third inlet extends farther into the channel than a wall separating the second inlet from the third inlet such that the second liquid contacts the fourth liquid before the first liquid contacts the fourth liquid.

11. A system for producing an optical element, comprising:
a mold including a plurality of inlets, an outlet, and a channel, wherein the channel is tapered towards the outlet, wherein each inlet of the mold is separated from an adjacent inlet by a wall that extends a certain distance into the channel to define a path for flow of liquid into the channel, and wherein each path is curved to follow a direction of the channel;
a dispensing device operable to:
form a first liquid and a second liquid, wherein the first liquid and the second liquid have different refractive indices, and wherein the dispensing device forms both the first liquid and the second liquid by adding a refractive index modifying agent to a third liquid; and
after forming the first liquid and the second liquid, introduce the first liquid into a first inlet of the mold and the second liquid into a second inlet of the mold;
at least one curing device; and
a controller configured to automate the following:
operating the dispensing device to control the introduction of the first and second liquids, such that the first and second liquids partially diffuse into each other inside the channel to form a multi-layer structure, and such that the multi-layer structure is extruded through the outlet onto a substrate; and
operating the at least one curing device to cure the first and second liquids, thereby forming a solid optical element having a spatially varying refractive index profile in at least one dimension.

12. The system of claim 11, wherein all of the inlets in the plurality of inlets feed into the channel.

13. The system of claim 11, wherein the controller is configured to set the spatially varying refractive index profile by controlling at least one of: temperatures at different points along the channel, a temperature of the channel over time, and a temperature of the substrate.

14. The system of claim 11, wherein the first and second liquids each comprise a resin.

15. The system of claim 14, wherein each of the resins is one of a silicone, a fluorosilicone, an acrylate, a urethane, an ester, an imide, an epoxy, or a thiol containing monomer or oligomer.

16. The system of claim 11, wherein the controller operates the at least one curing device to fully cure the first and second liquids after the multi-layer structure has been extruded onto the substrate, and wherein the first and second liquids continue to diffuse into each other until fully cured.

17. The system of claim 11, wherein the controller operates the dispensing device to introduce a fourth liquid with a refractive index different from that of the first liquid and the second liquid into a third inlet of the mold to form, in the multi-layer structure, three adjacent layers with progressively increasing or progressively decreasing refractive indices, wherein the third inlet is adjacent to the first inlet and the second inlet, and wherein a wall separating the first inlet from the third inlet extends farther into the channel than a wall separating the second inlet from the third inlet such that the second liquid contacts the fourth liquid before the first liquid contacts the fourth liquid.

18. A method for producing a light guide, comprising:
forming a first liquid and a second liquid, wherein the first liquid and the second liquid have different refractive indices, and wherein forming the first liquid and the second liquid comprises forming both the first liquid and the second liquid by adding a refractive index modifying agent to a third liquid;
after forming the first liquid and the second liquid, introducing the first liquid into a first inlet of a mold, the second liquid into a second inlet of the mold, and a third liquid with a refractive index different from that of the first liquid and the second liquid into a third inlet of the mold, wherein each inlet of the mold is connected to a channel that extends to an outlet of the mold, wherein the channel is tapered towards the outlet, wherein each inlet of the mold is separated from an adjacent inlet by a wall that extends a certain distance into the channel to define a path for flow of liquid into the channel, wherein each path is curved to follow a direction of the channel, and wherein upon contact, the liquids partially diffuse into each other inside the channel to form a multi-layer structure;
arranging the liquids so that a central layer of the multi-layer structure has the highest refractive index, the refractive indices of the remaining layers are symmetric about the central layer, and the refractive indices progressively decrease between layers, from the central layer outward;
extruding the multi-layer structure through the outlet, onto a substrate; and
curing the liquids, thereby forming a solid light guide having a spatially varying refractive index profile in at least one dimension.

19. The method of claim 1, wherein forming the first liquid and the second liquid comprises forming both the first liquid and the second liquid by adding, as the refractive index modifying agent, nanoparticles to the third liquid.

20. The method of claim 8, wherein the first liquid and the second liquid mutually diffuse upon contact with each other inside the channel such that a refractive index at an interface between the first liquid and second liquid is determined by the refractive index of the first liquid and the refractive index of the second liquid.

* * * * *